United States Patent
Arens et al.

(10) Patent No.: US 7,200,663 B2
(45) Date of Patent: Apr. 3, 2007

(54) MANAGEMENT METHOD FOR PARAMETER SETS FOR A DATA TECHNOLOGICALLY PARAMETERIZABLE DEVICE

(75) Inventors: Stephan Arens, Nuremberg (DE);
Thomas Birkhoelzer, Radolfzell (DE);
Karlheinz Dorn, Kalchreuth (DE);
Martin Herget, Erlangen (DE); Klaus Moritzen, Moehrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 815 days.

(21) Appl. No.: 10/352,104

(22) Filed: Jan. 28, 2003

(65) Prior Publication Data
US 2003/0163564 A1 Aug. 28, 2003

(30) Foreign Application Priority Data
Jan. 28, 2002 (DE) ................. 102 03 224

(51) Int. Cl.
*G06F 15/16* (2006.01)
(52) U.S. Cl. ..................... 709/226
(58) Field of Classification Search .............. 709/217, 709/213, 223
See application file for complete search history.

(56) References Cited

U.S. PATENT DOCUMENTS 5,276,606 A * 1/1994 Mizukami et al. ............. 700/86
5,781,626 A * 7/1998 Koue ........................ 379/361
5,986,636 A * 11/1999 Wu ............................. 345/691
6,029,174 A    2/2000 Sprenger et al.
6,035,050 A * 3/2000 Weinfurtner et al. ........ 381/313
6,745,238 B1* 6/2004 Giljum et al. .............. 709/219
6,950,109 B2* 9/2005 Deering ..................... 345/589

OTHER PUBLICATIONS

Zioulas, G. et al. "The BaBar Online Databases," Internet Conf. on Computing in High-Energy Physics and Nuclear Physics, (CHEP 2000), 2000, pp. 1-4. http://chep2000.pd.infn.it/paper/pab-b112.pdf.
Nwana, Hyacinth S. "Software Agents: An Overview", Kapitel 1-9, p. 1/1-2/1-2/1-4/1-22/1-2/1/1/1-7, aus Knowledge Engineering Review, vol. 11, No. 3, pp. 1-40, Cambridge University Press, 1996, im. internet:http://agents.umbc.edu/introduction/ao/.
German Office Action dated May 16, 2006.

* cited by examiner

*Primary Examiner*—David Y. Eng
(74) *Attorney, Agent, or Firm*—Harness, Dickey & Pierce, P.L.C.

(57) ABSTRACT

A central computer receives from a supplier a parameter set for a data technologically parameterizable device and buffer-stores it. The central computer communicates the parameter set to a decision-maker. It incorporates the parameter set into a parameter set list if the central computer is prescribed an acceptance command by an operator. Parameter sets incorporated into the parameter set list can be communicated from the central computer to an interrogator at the request of the interrogator.

38 Claims, 3 Drawing Sheets

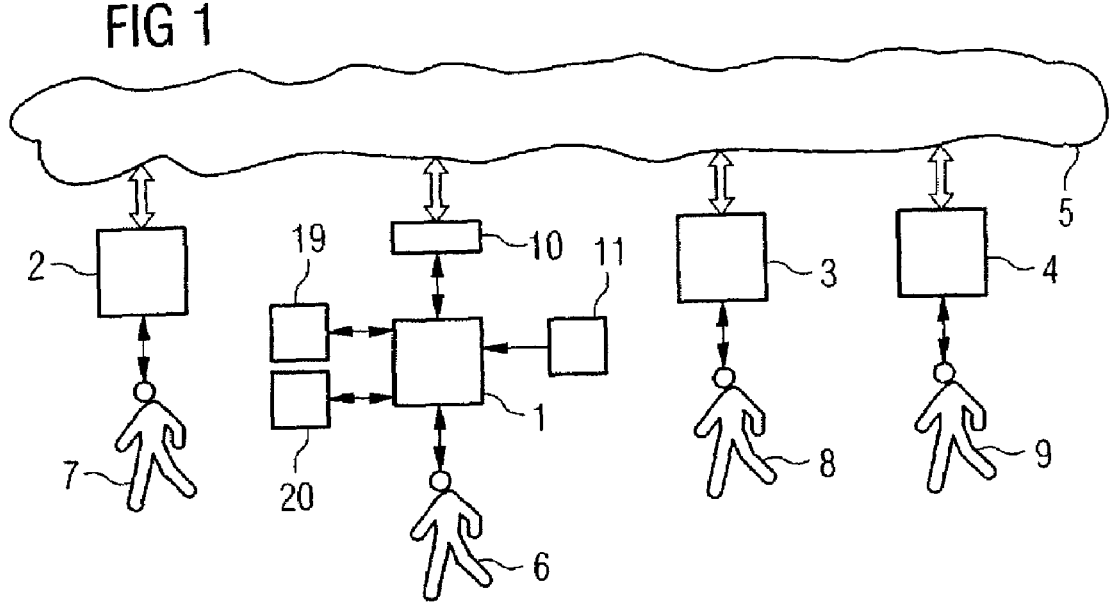
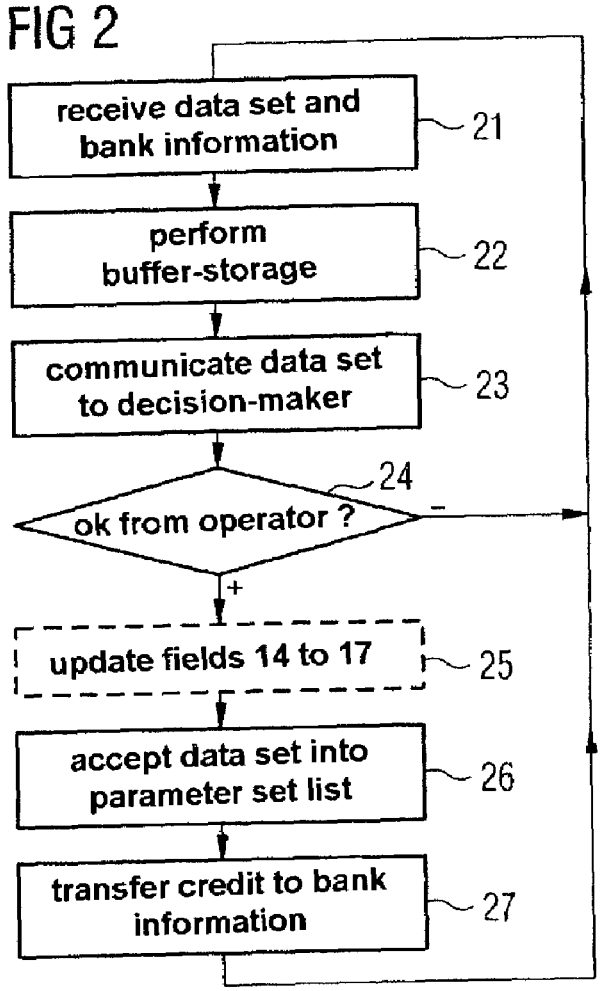

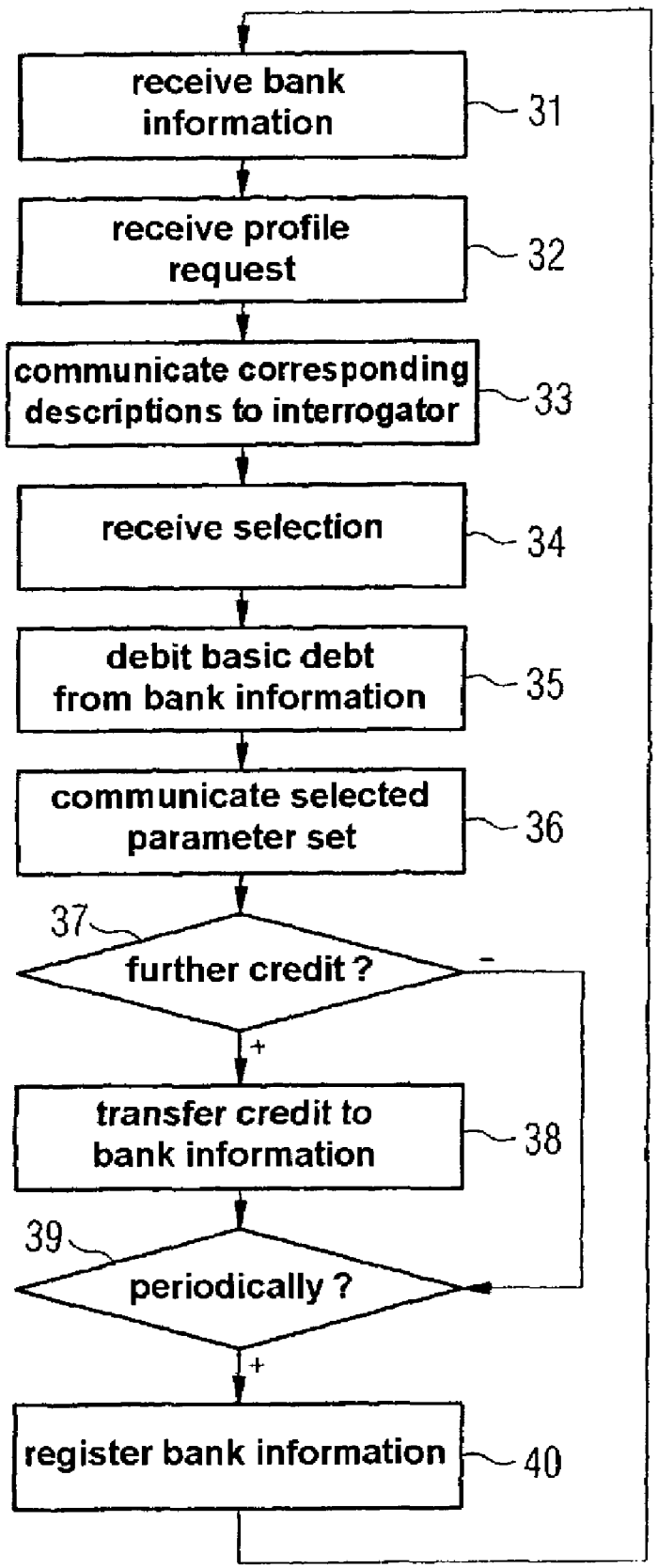

MANAGEMENT METHOD FOR PARAMETER SETS FOR A DATA TECHNOLOGICALLY PARAMETERIZABLE DEVICE

The present application hereby claims priority under 35 U.S.C. §119 on German patent application number 10203224.6 filed Jan. 28, 2002, the entire contents of which are hereby incorporated herein by reference.

FIELD OF THE INVENTION

The present invention generally relates to a management method for parameter sets for a data technologically parameterizable device.

BACKGROUND OF THE INVENTION

Data technologically parameterizable devices are widespread. Examples of such devices are PCs, other computers and process-controlled apparatuses e.g. appertaining to medical technology such as magnetic resonance scanners or findings workstations.

Such apparatuses generally afford very diverse configuration and setting possibilities in order to be able to adapt them and their use to specific requirements. Thus, in the case of medical apparatuses, it is possible, by way of example, to input recording programs, tool supports, representations, input or output fields or parameters for algorithms.

The quantity, complexity and in some instances also the mutual dependence of the parameters that can be set, overtaxes most of the users of data technologically parameterizable devices. Therefore, the parameters are generally set in one of the three variants below:

The manufacturer prescribes one or a plurality of preset values (=parameter sets). This procedure has the disadvantage that the manufacturer has neither the requisite expert knowledge nor the requisite resources to cover all possible fields of application. Therefore, the manufacturer is generally restricted to a relatively small subset of the possible parameter sets.

The user himself determines a setting of the parameters which is favorable for him. It is highly time-consuming and possible only for few users.

A specialist determines a good or optimum configuration for the user. This procedure is time-consuming and costly.

SUMMARY OF THE INVENTION

An object of an embodiment of the present invention is to provide a management method for parameter sets for a data technologically parameterizable device by means of which the users of the data technologically parameterizable device can be provided, at least for the most part, with a parameter set which is tailored for the respective user to his respective application.

The object is achieved by
a central computer receiving from a supplier a parameter set for the data technologically parameterizable device and buffer-storing it,
the received parameter set being communicated from the central computer to a decision-maker,
the received parameter set being incorporated into a parameter set list by the central computer if the central computer is prescribed an acceptance command by an operator,
the parameter set incorporated into the parameter set list being able to be communicated from the central computer to an interrogator upon request by the interrogator.

This is because in principle a multiplicity of parameter sets are available for selection on account of the acceptance of the parameter sets by the central computer. By virtue of the acceptance of the parameter sets only after an enabling by the operator (which is in turn effected after a check by the decision-maker), it is possible in this case to ensure that, rather than arbitrary parameter sets, only parameter sets found to be proper are communicated to the interrogator. This is of great importance for the operator of the central computer in particular for legal liability and image reasons.

In this case, the term "supplier" is to be understood merely in the sense that the supplier supplies the parameter set. Supplier in the sense of an embodiment of the present invention may be either a human or a data technological device. The decision-maker and the interrogator may also be, in principle, a human or a data technological device. The operator is always a human.

If the central computer also receives an initial description assigned to the received parameter set, and the initial description is also buffer-stored and communicated to the decision-maker, the check of the parameter set by the decision-maker is simpler. Particularly if performance features of the parameter set are specified in the assigned initial description, it is thus possible to verify in a simpler manner whether the communicated parameter set actually has the properties asserted by the supplier.

Preferably, the central computer also receives bank information assigned to the received parameter set, and transfers a credit to the bank information if the received parameter set is incorporated into the parameter set list. This is because this provides an incentive for the supplier to make the parameter set available. In this case, the credit may optionally be dependent on or independent of a communication of the parameter set to the interrogator.

If an end description is assigned to the parameter set by the operator, and the assigned description can be communicated to the interrogator before a request of the parameter set, a suitable parameter set can be selected by the interrogator in an easier and more targeted manner. This applies especially if the assigned end description specifies performance features and/or areas of application of the parameter set.

Preferably, the central computer receives bank information before the parameter set is communicated to the interrogator, and debits a basic debit to the bank information if the parameter set is communicated to the interrogator. This is because this enables the operator of the central computer to amortize his costs for procuring and keeping the parameter sets in a simple manner.

If, after the parameter set has been communicated to the interrogator, an additional debit is debited to the bank information at periodic intervals, a subscription can be realized in a simple manner.

If the central computer communicates with the supplier and/or the decision-maker and/or the interrogator via a web portal, it is possible to have recourse to proven standard procedures for the communication.

If the parameter set is a parameter set for a medical technological system, the management method is of particularly great practical and economic importance.

BRIEF DESCRIPTION OF THE DRAWINGS

Further advantages and details emerge from the following description of an exemplary embodiment in conjunction with the drawings, in which, in a basic illustration, FIG. 1 shows a computer interconnection, FIGS. 2–4 show flow diagrams.

DETAILED DESCRIPTION OF THE PREFERRED EMBODIMENTS

Figure 4:
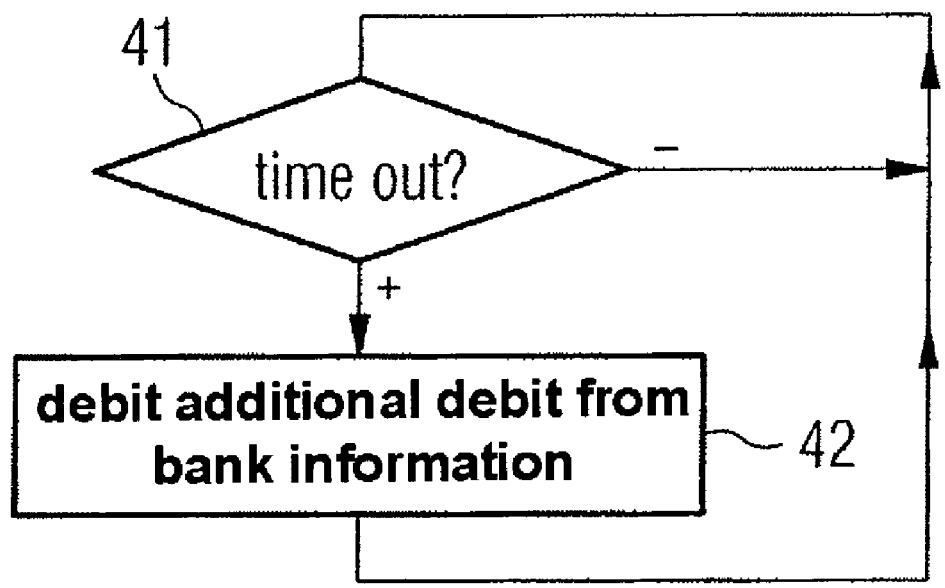

In accordance with FIG. 1, a plurality of computers 1 to 4 are connected to a computer network 5. The computer network 5 may be e.g. the Internet. The computers 1 to 4 are a central computer 1, a supplier computer 2, a decision-maker computer 3 and an interrogator computer 4.

The central computer 1 communicates interactively with an operator 6, the supplier computer 2 with a supplier 7, the decision-maker computer 3 with a decision-maker 8 and the interrogator computer 4 with an interrogator 9. The central computer 1 communicates with the other computers 2 to 4 via a web portal 10.

The central computer 1 processes a computer program product 11. Under the control of the computer program product 11, the central computer 1 executes the routines that are described below in conjunction with FIGS. 2 to 4.

Figure 5:
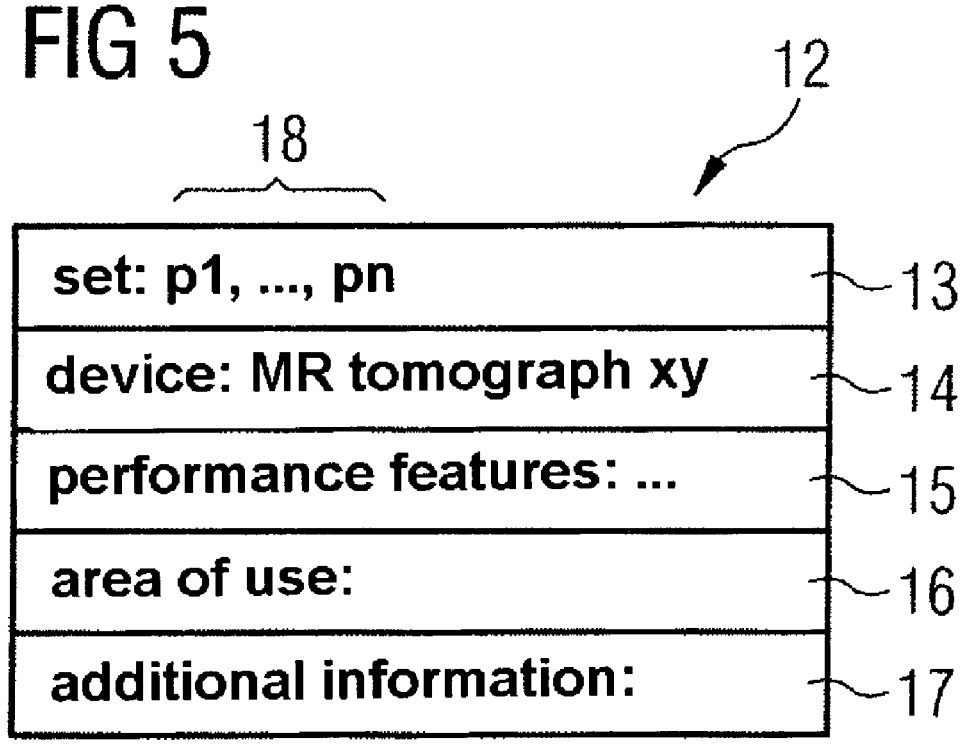
FIG. 5 shows a data set.

In accordance with FIG. 2, in the context of the communication with the supplier computer 2, firstly in a step 21, the central computer 1 receives a data set 12 and assigned bank information. As can be seen from FIG. 5, the data set 12 includes a plurality of fields 13 to 17. A parameter set 18 is stored in the first field 13. In this case, the parameter set 18 includes individual parameters p1 to pn that can be set. Furthermore, in the field 14, the data set 12 is assigned a description which reveals the data technologically parameterizable device for which the parameter set 18 is intended. In accordance with FIG. 5, the data set is intended for example for a magnetic resonance tomograph of a very specific type xy. The parameter set 18 is thus a parameter set 18 for a medical technological system. Performance features of the parameter set 18 and typical areas of use of the parameter set 18 are stored in further fields 15, 16. Finally, the data set 12 may also have a free text description in the field 17.

In a step 22, the details communicated are buffer-stored by the central computer 1 in a buffer memory 20. In a step 23, the central computer 1 communicates the received and buffer-stored data set 12 to the decision-maker computer 3. The latter outputs it to the decision-maker 8. The decision-maker 8 checks the communicated data set 12. This may be done for example by checking on a sheet of paper, by simulation on the decision-maker computer 3 or by a genuine test on a suitable data technologically parameterizable device. In particular, the decision-maker 8 in this case checks the performance features of the parameter set 18 which are specified in the field 15.

The decision-maker 8 communicates the result of the check by said decision-maker to the operator 6. In this case, the communication can again be effected via the decision-maker computer 3 and the central computer 1. However, a different type of communication (e.g. by mail or by telephone) is also conceivable.

Depending on the communicated evaluation of the received data set 12 by the decision-maker 8, the operator 6 prescribes for the central computer 1 whether or not the buffer-stored data set 12 is to be accepted into a parameter set list 19 from the buffer memory 20. Thus, in a step 24, the central computer 1 checks whether it has received an acceptance command from the operator 6. If it does not receive said command, it returns to step 21, otherwise it executes steps 25 to 27.

In step 26, the central computer 1 incorporates the received and buffer-stored data set 12 into the parameter set list 19. In particular, the central computer 1 thus not only accepts the parameter set 18 as such, but also the further fields 14 to 17, that is to say also the performance features and the preferred areas of application for the parameter set 18, into the parameter set list 19. If appropriate, before the acceptance of the data set 12, it is possible in this case for the fields 14 to 17 to be updated by the operator 6 in step 25. On the basis of the information contained in the fields 14 to 17, in particular a classification of the parameter sets 18 is possible, e.g. according to area of application, type of examination, etc. In step 27, the central computer 1 transfers a credit to the bank information which was previously communicated to it in step 21.

It is possible that no further credit is subsequently made to the bank information. In this case, the credit is independent of the communication of the parameter set 18 to the interrogator 9.

In accordance with FIG. 3, in the case of the communication between central computer 1 and interrogator computer 4, the central computer 1 first receives interrogator bank information in a step 31. Only afterward does the central computer 1 receive a profile request from the interrogator computer 4 in a step 32. On account of the profile request, in a step 33, the central computer 1 firstly communicates the corresponding descriptions, that is to say the information contained in the fields 14 to 17, to the interrogator computer 4 and thus also to the interrogator 9 in a step 33.

In a step 34, the central computer 1 then receives a selection of a specific parameter set 18. On account of the received selection, the central computer 1 debits a basic debit from the interrogator bank information in a step 35. Only afterward does the central computer 1 communicate the selected parameter set 18 to the interrogator computer 4 in a step 36. Consequently, the interrogator computer 4 can retrieve any parameter set 18 contained in the parameter set list 19 by means of a corresponding request from the central computer 1.

In a step 37, the central computer 1 checks whether, on account of the retrieval of the parameter set 18, a further credit is to be made to the supplier of the parameter set 18. If so, a further credit is credited to the supplier bank information in a step 38. In this case, the total credit is, of course, dependent on the communication of the parameter set to the interrogator 9.

Finally, in a step 39, the central computer 1 checks whether an additional debit is to be debited to the interrogator bank information at periodic intervals on account of the communication of the parameter set 18. If this is the case, the interrogator bank information is correspondingly registered in a step 40.

In accordance with FIG. 4, the central computer 1 also executes a routine in which, in a step 41, it checks whether a basic time has elapsed. If this is the case, in a step 42, the central computer 1 instigates the debiting of the additional debit from the interrogator bank information which was registered in step 40 in accordance with FIG. 3.

Consequently, a multiplicity of parameter sets for a data technologically parameterizable device can be made available to a multiplicity of interrogators 9 in a simple manner by means of the management method according to an embodiment of the invention. The interrogators are thus able to select the respective optimum parameter set 18 for their requirements in a simple manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for handling parameter sets for a data technologically parameterizable device, executed by a central computer, the method comprising:

receiving, over a computer network, from a supplier, a parameter set for the data technologically parameterizable device;

buffer storing the received parameter set;

communicating the received parameter set over the computer network from the supplier to a decision-maker;

incorporating the received parameter set into a parameter set list if the central computer is prescribed an acceptance command by an operator; and communicating the parameter set incorporated into the parameter set list over the computer network from the central computer to an interrogator upon request by the interrogator transmitted over the computer network.

2. The method as claimed in claim 1, wherein the central computer also receives an initial description assigned to the received parameter set, and wherein the initial description is also buffer-stored and communicated to the decision-maker.

3. The method as claimed in claim 2, wherein performance features of the parameter set are specified in the assigned description.

4. The method as claimed in claim 3, wherein the central computer also receives bank information assigned to the received parameter set, and wherein a credit is transferred to the bank information if the received parameter set is incorporated into the parameter set list.

5. The method as claimed in claim 4, wherein the credit is dependent on a communication of the parameter set to the interrogator.

6. The method as claimed in claim 4, wherein the credit is independent of a communication of the parameter set to the interrogator.

7. The method as claimed in claim 2, wherein the central computer also receives bank information assigned to the received parameter set, and wherein a credit is transferred to the bank information if the received parameter set is incorporated into the parameter set list.

8. The method as claimed in claim 7, wherein the credit is dependent on a communication of the parameter set to the interrogator.

9. The method as claimed in claim 7, wherein the credit is independent of a communication of the parameter set to the interrogator.

10. The method as claimed in claim 2, wherein an end description is assigned to the parameter set by the operator, and wherein the assigned end description can be communicated to the interrogator before a request of the parameter set.

11. The method as claimed in claim 10, wherein the assigned end description specifies at least one of performance features and areas of application of the parameter set.

12. The method as claimed in claim 2, wherein the central computer receives bank information before the parameter set is communicated to the interrogator, and wherein a basic debit is debited to the bank information if the parameter set is communicated to the interrogator.

13. The method as claimed in claim 12, wherein, after the parameter set has been communicated to the interrogator, an additional debit is debited to the bank information at periodic intervals.

14. The method as claimed in claim 2, wherein the central computer communicates with at least one of the supplier, the decision-maker and the interrogator via a web portal.

15. The method as claimed in claim 2, wherein the parameter set is a parameter set for a medical technological system.

16. The method as claimed in claim 1, wherein the central computer also receives bank information assigned to the received parameter set, and wherein a credit is transferred to the bank information if the received parameter set is incorporated into the parameter set list.

17. The method as claimed in claim 16, wherein the credit is dependent on a communication of the parameter set to the interrogator.

18. The method as claimed in claim 16, wherein the credit is independent of a communication of the parameter set to the interrogator.

19. The method as claimed in claim 16, wherein the parameter set is a parameter set for a medical technological system.

20. The method as claimed in claim 1, wherein an end description is assigned to the parameter set by the operator, and wherein the assigned end description can be communicated to the interrogator before a request of the parameter set.

21. The method as claimed in claim 20, wherein the assigned end description specifies at least one of performance features and areas of application of the parameter set.

22. The method as claimed in claim 20, wherein the parameter set is a parameter set for a medical technological system.

23. The method as claimed in claim 1, wherein the central computer receives bank information before the parameter set is communicated to the interrogator, and wherein a basic debit is debited to the bank information if the parameter set is communicated to the interrogator.

24. The method as claimed in claim 23, wherein, after the parameter set has been communicated to the interrogator, an additional debit is debited to the bank information at periodic intervals.

25. The method as claimed in claim 23, wherein the parameter set is a parameter set for a medical technological system.

26. The method as claimed in claim 1, wherein the central computer communicates with at least one of the supplier, the decision-maker and the interrogator via a web portal.

27. The method as claimed in claim 1, wherein the parameter set is a parameter set for a medical technological system.

28. A computer-readable medium tangibly storing a program of instruction executable by a computer to perform a method comprising:

receiving, over a computer network, from a supplier, a parameter set for the data technologically parameterizable device;

buffer storing the received parameter set;

communicating the received parameter set over the computer network from the supplier to the to a decision-maker;

incorporating the received parameter set into a parameter set list if the central computer is prescribed an acceptance command by an operator; and communicating the parameter set incorporated into the parameter set list over the computer network from the central computer to an interrogator upon request by the interrogator transmitted over the computer network.

29. The instructions of claim 28, wherein the central computer also receives an initial description assigned to the received parameter set, and wherein the initial description is also buffer-stored and communicated to the decision-maker.

30. The instructions of claim 28, wherein the central computer also receives bank information assigned to the received parameter set, and wherein a credit is transferred to the bank information if the received parameter set is incorporated into the parameter set list.

31. The instructions of claim 28, wherein an end description is assigned to the parameter set by the operator, and wherein the assigned end description can be communicated to the interrogator before a request of the parameter set.

32. The instructions of claim 28, wherein the central computer receives bank information before the parameter set is communicated to the interrogator, and where a basic debit is debited to the bank information if the parameter set is communicated to the interrogator.

33. A computer-readable medium tangibly storing a program of instruction executable by a computer to perform a method comprising:

receiving, over a computer network, from a supplier, a parameter set for the data technologically parameterizable device;

buffer storing the received parameter set;

communicating the received parameter set over the computer network from the supplier to the to a decision-maker;

incorporating the received parameter set into a parameter set list if the central computer is prescribed an acceptance command by an operator; and communicating the parameter set incorporated into the parameter set list over the computer network from the central computer to an interrogator upon request by the interrogator transmitted over the computer network.

34. The instructions of claim 33, wherein the central computer also receives an initial description assigned to the received parameter set, and wherein the initial description is also buffer-stored and communicated to the decision-maker.

35. The instructions of claim 33, wherein the central computer also receives bank information assigned to the received parameter set, and wherein a credit is transferred to the bank information if the received parameter set is incorporated into the parameter set list.

36. The instructions of claim 33, wherein an end description is assigned to the parameter set by the operator, and wherein the assigned end description can be communicated to the interrogator before a request of the parameter set.

37. The instructions of claim 33, wherein the central computer receives bank information before the parameter set is communicated to the interrogator, and wherein a basic debit is debited to the bank information if the parameter set is communicated to the interrogator.

38. A device handling parameter sets for a data technologically parameterizable device, comprising:

means for receiving a parameter set for the data technologically parameterizable device from a supplier over a computer network;

means for buffer storing the received parameter set;

means for communicating the received parameter set to a decision-maker;

means for incorporating the received parameter set into a parameter set list, if an acceptance command is received by an operator; and means for communicating the parameter set incorporated into the parameter set list over the computer network to an interrogator upon request by the interrogator transmitted over the computer network.

* * * * *